United States Patent
Ros Sanchez

(10) Patent No.: US 10,671,077 B2
(45) Date of Patent: Jun. 2, 2020

(54) SYSTEM AND METHOD FOR FULL-STACK VERIFICATION OF AUTONOMOUS AGENTS

(71) Applicant: TOYOTA RESEARCH INSTITUTE, INC., Los Altos, CA (US)

(72) Inventor: German Ros Sanchez, San Francisco, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 133 days.

(21) Appl. No.: 15/955,320

(22) Filed: Apr. 17, 2018

(65) Prior Publication Data
US 2019/0317510 A1  Oct. 17, 2019

(51) Int. Cl.
G05D 1/02 (2020.01)
G05D 1/00 (2006.01)
G06N 3/08 (2006.01)

(52) U.S. Cl.
CPC ......... G05D 1/0214 (2013.01); G05D 1/0088 (2013.01); G05D 1/0221 (2013.01); G06N 3/08 (2013.01); G05D 2201/0212 (2013.01); G05D 2201/0213 (2013.01)

(58) Field of Classification Search
CPC .. G05D 1/0088; G05D 1/0214; G05D 1/0221; G05D 2201/0212; G05D 2201/0213; G06N 3/08
See application file for complete search history.

(56) References Cited

U.S. PATENT DOCUMENTS

| | | | |
|---|---|---|---|
| 8,892,491 B2 | 11/2014 | Wang et al. | |
| 9,216,745 B2 | 12/2015 | Beardsley et al. | |
| 9,868,393 B2 | 1/2018 | Bahgat et al. | |
| 10,324,467 B1* | 6/2019 | Abeloe | G10L 15/16 |
| 2015/0363940 A1 | 12/2015 | Held et al. | |
| 2016/0082597 A1* | 3/2016 | Gorshechnikov | G06N 5/02 700/253 |
| 2018/0330178 A1* | 11/2018 | el Kaliouby | G06K 9/00845 |
| 2019/0050729 A1* | 2/2019 | Lakshmanan | G06N 3/08 |
| 2019/0303759 A1* | 10/2019 | Farabet | G06K 9/00791 |
| 2019/0310650 A1* | 10/2019 | Halder | G06N 3/08 |

FOREIGN PATENT DOCUMENTS

WO  2014190208  11/2014

* cited by examiner

*Primary Examiner* — Hussein Elchanti
(74) *Attorney, Agent, or Firm* — Seyfarth Shaw LLP

(57) ABSTRACT

A method for full-stack verification of autonomous agents includes training a neural network to learn a noise model associated with an object detection module of an autonomous agent system of an autonomous vehicle. The method also includes replacing the object detection module of the autonomous agent system with the neural network and a sensory input of the object detection module with ground truth information to apply a surrogate function to the ground truth information. The method further includes verifying the autonomous agent system including the trained neural network to apply the surrogate function in response to the ground truth information to simulate sensor information data to at least a planner module of the autonomous agent system. The method also includes controlling a behavior of the autonomous vehicle using the verified autonomous agent system including the object detection module.

19 Claims, 9 Drawing Sheets

SYSTEM AND METHOD FOR FULL-STACK VERIFICATION OF AUTONOMOUS AGENTS

BACKGROUND

Field

Certain aspects of the present disclosure generally relate to machine learning and, more particularly, to a system and method for full-stack verification of autonomous agents.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing due to the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and becoming a reality in this decade. Unfortunately, because autonomous agents have to interact with humans, many critical concerns arise. The biggest concern is safety. For example, how can we ensure that an autonomous agent or system is safe? To this end, outstanding verification procedures are desired. Unfortunately, verifying autonomous agents may involve creating stress situations to test the behavior of agents in corner cases or atypical situations.

SUMMARY

A method for full-stack verification of autonomous agents may include training a neural network to learn a noise model associated with an object detection module of an autonomous agent system of an autonomous vehicle. The method may also include replacing the object detection module of the autonomous agent system with the neural network and a sensory input of the object detection module with ground truth information to apply a surrogate function to the ground truth information. The method may further include verifying the autonomous agent system including the trained neural network to apply the surrogate function in response to the ground truth information to simulate sensor information data to at least a planner module of the autonomous agent system. The method may also include controlling a behavior of the autonomous vehicle using the verified autonomous agent system including the object detection module.

A non-transitory computer-readable medium having program code recorded thereon for full-stack verification of autonomous agents. The program code of the non-transitory computer-readable system may be executed by a processor. The program code may include program code to train a neural network to learn a noise model associated with an object detection module of an autonomous agent system. The program code may also include program code to replacing the object detection module of the autonomous agent system with the neural network and a sensory input of the object detection module with ground truth information to apply a surrogate function to the ground truth information. The program code may further include program code to verifying the autonomous agent system including the trained neural network to apply the surrogate function in response to the ground truth information to simulate sensor information data to at least a planner module of the autonomous agent system. The program code may also include program code to controlling a behavior of an autonomous vehicle using the verified autonomous agent system including the object detection module.

A system for full-stack verification of an autonomous vehicle system may include a neural network. The neural network may be configured to learn a noise model associated with an object detection module of the autonomous vehicle system. The object detection module of the autonomous vehicle system may be replaced with the neural network and a sensory input of the autonomous vehicle system is replaced with ground truth information during the full-stack verification. The neural network may be further configured to apply a surrogate function to the ground truth information to simulate sensor information data to at least a planner module of the autonomous vehicle system. Full-stack verification of at least the planner module during corner cases and/or atypical situations presented by a simulated sensor information data. A controller of an autonomous vehicle may be configured to improve the behavior of the autonomous vehicle during real-world extreme situations.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
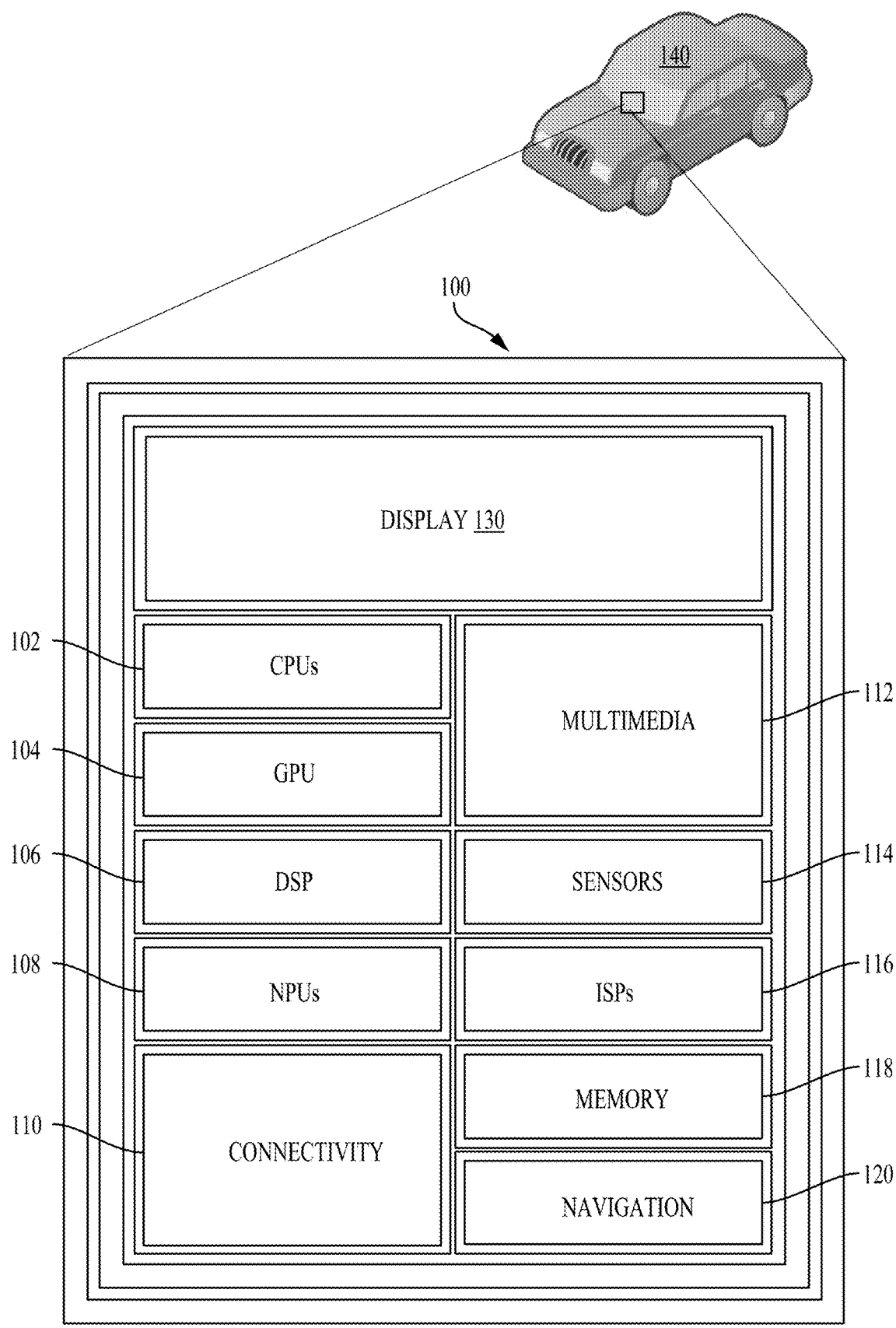
FIG. 1 illustrates an example implementation of designing a neural network using a system-on-a-chip (SOC) of a vehicle vision system of an autonomous agent, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Aspects of the present disclosure are directed to a system and method for fast full-stack verification of autonomous agents using system simulated sensor information. In aspects of the present disclosure, the system generated sensor information simulates real-world conditions with sufficient fidelity for certifying correct behavior and safety of an autonomous agent under development. One configuration for full-stack autonomous agent verification is based on a strategy for reparametrizing modules in a pipeline of the autonomous system that consume sensory data. This novel system and method is described for producing high-fidelity simulation of autonomous agents to perform system verification.

Autonomous agents, such as driverless cars and robots, are evolving quickly and becoming a reality this decade. Operation of autonomous vehicles and semi-autonomous vehicles may be controlled or adjusted based on predicted actions (e.g., behaviors) of surrounding agents, such as vehicles and pedestrians. For example, a route may be planned for an autonomous vehicle based on the predicted actions of surrounding agents. In addition, a route may be adjusted to avoid a collision based on the predicted actions of surrounding agents. In the present disclosure, unless otherwise noted, a vehicle refers to an autonomous agent or a semi-autonomous agent.

Conventional vehicles are controlled based on predicted trajectories of surrounding agents. The trajectories of surrounding agents may be predicted using Markov chains, or other probabilistic approaches, to provide a low-level prediction of movements. The trajectories predict where an agent may travel from a current time to a future time. These predicted trajectories may be used to adjust a route of the autonomous agent to avoid a collision based on the predicted actions of surrounding agents.

Unfortunately, testing, for example, the collision avoidance features of an autonomous agent may be difficult in real-world situations. In particular, because autonomous agents interact with humans, concerns may arise. One specific concern is safety. How can we ensure that an autonomous agent or system is safe? To this end, outstanding verification procedures are desired. Currently, state-of-the-art algorithms and systems to verify autonomous systems rely on logging the behavior of the system under study while it interacts with its surrounding environment. This may involve creating stress situations to test the behavior of the agent in corner cases or atypical situations. Given the risk of these tests for human lives, such tests may be performed in simulation environments.

Simulation environments enable testing of corner cases and extreme situations in a safe way (e.g., without putting human lives in danger). Furthermore, a verification process for the autonomous agents may be executed in parallel by running copies of a simulator in multiple distributed nodes.

Unfortunately, designing simulators so that they allow for high-fidelity verification remains a challenge. In particular, producing high-fidelity simulation involves recreating a degree of realism of the sensors in simulation. This is an important challenge involving photo-realistic rendering frameworks based on path tracing techniques or physically-based rendering (PBR) workflows for generating photo-realistic sensor information.

Designing autonomous agent simulators that support high-fidelity verification remains a challenge. On one hand, planning and control modules of an autonomous agent involve exposure to trillions of variations, accounting for different areas and interactions with other agents (e.g., vehicles, pedestrians, etc.). Making this process feasible involves designing a simulator capable of running simulation episodes faster than real-time. On the other hand, the perception stack of an autonomous agent, involves parts that consume sensory information (e.g., from cameras, lasers, etc.).

Generating photo-realistic sensor information is a potential bottleneck to the simulator because generating this information consumes significant processing time (e.g., minutes to hours). In particular, producing high-fidelity simulation involves recreating the degree of realism of real-world sensor image data in simulation. This is typically a significant and time consuming challenge, which involves using the noted photo-realistic rendering frameworks. Unfortunately, generating photo-realistic sensor information causes a significant bottleneck in the simulator because generating this information consumes minutes to hours of processing time. Such a bottleneck is one of the main limiting factors in modern full-stack verification systems.

Therefore, in full-stack verification (verifying the entire system holistically), the modules consuming sensory data are a significant bottleneck. To solve this problem, the present disclosure provides a reformulation approach of an autonomous agent system, as explained below.

A system and method for full-stack verification of autonomous agents, according to aspects of the present disclosure, trains a convolutional neural network to learn a noise model associated with ground truth 3D sensor image data. That is, an object detection stack of an autonomous agent system is generally a consumer of sensor image data. Aspects of the present disclosure replace the object detection stack with a trained convolutional neural network during simulation testing. That is, a perception module of an autonomous agent system is converted from a consumer of 3D real-world sensor image data to a consumer of system simulated sensor information data during full-stack verification. In one configuration, supervised learning of the convolutional network is performed using original 3D real-world sensor image data upon which the object detection module was initially trained as ground truth sensor image data. Based on this ground truth sensor image data, the convolutional network is trained to approximate a noise model from the ground truth sensor image data and the original 3D real-world sensor image data.

An artificial neural network, which may comprise an interconnected group of artificial neurons (e.g., neuron models), is a computational device or represents a method to be performed by a computational device. For example, convolutional neural networks are a type of feed-forward artificial neural network used in the area of object detection and classification. In particular, convolutional neural networks (CNNs) may be trained to recognize various viewpoints of a detected object in a region of interest of an image, and thus, have been used in object recognition and other classification applications. Other models are also available for object recognition and classification. For example, support vector machines (SVMs) are learning algorithms that can be applied for classification.

Aspects of the present disclosure are related to a machine learning system and method for estimating a noise model associated with ground truth 3D sensory image data. The estimated noise model is combined with the ground truth 3D sensory image data to represent system simulated sensor information data. This system simulated sensor information data is generated by a trained neural network module of an autonomous agent in response to the ground truth 3D sensor image data. The system simulated sensor information data is used rather than a sensor signal from one or more sensors (e.g., light detection and ranging (LIDAR) sensors, sonar sensors, red-green-blue (RGB) cameras, RGB-depth (RGB-D) cameras, and the like) of the autonomous agent. This novel system and method is described for producing high-fidelity simulation sensor image data for autonomous agents to perform system verification. The novel system and method avoids the bottleneck caused by using system simulated photo-realistic sensor image data generated by the noted photo-realistic rendering frameworks.

FIG. 1 illustrates an example implementation of the aforementioned system and method for full-stack verification of autonomous agents using a system-on-a-chip (SOC) 100 of a vehicle vision system for an autonomous vehicle 140. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 140. In this arrangement, the autonomous vehicle 140 may include a processor and other features of the SOC 100. In this aspect of the present disclosure, instructions loaded into a processor (e.g., CPU 102) or the NPU 108 of the autonomous vehicle 140 may include code for detecting one or more objects in a region of interest in an image captured by the sensor processor 114. The instructions loaded into a processor (e.g., CPU 102) may also include code for planning and control in response to one or more objects detected in the region of interest in the image captured by the sensor processor 114.

Figure 2:
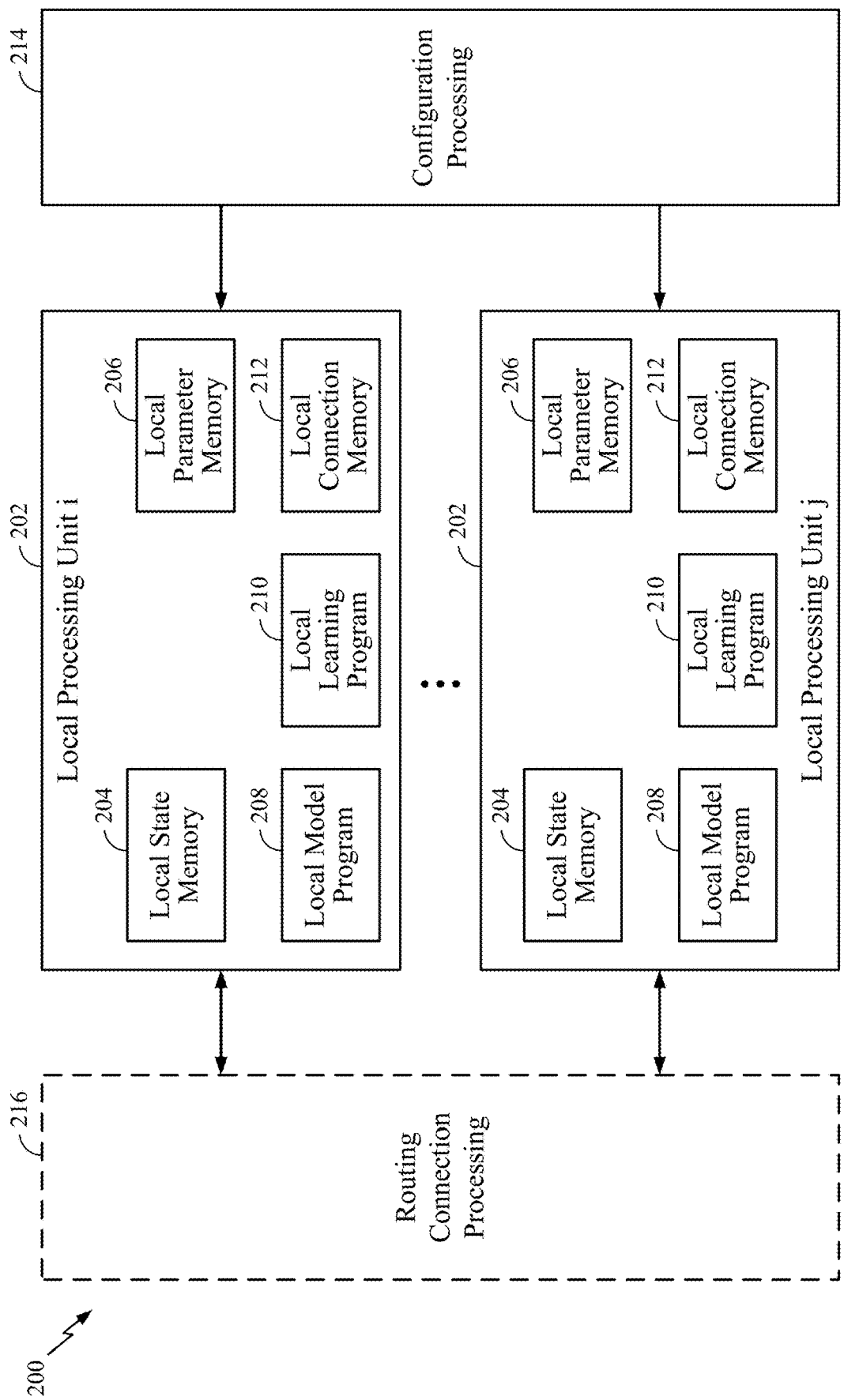
FIG. 2 illustrates an example implementation of a system, in accordance with aspects of the present disclosure.

FIG. 2 illustrates an example implementation of a system 200 in accordance with certain aspects of the present disclosure. As illustrated in FIG. 2, the system 200 may have local processing units 202 that may perform various operations of methods described herein. Each of the local processing units 202 may comprise a local state memory 204 and a local parameter memory 206 that may store parameters of a neural network. In addition, each of the local processing units 202 may have a local (neuron) model program (LMP) memory 208 for storing a local model program, a local learning program (LLP) memory 210 for storing a local learning program, and a local connection memory 212. Furthermore, as illustrated in FIG. 2, each of the local processing units 202 may interface with a configuration processing unit 214 for providing configurations for local memories of the local processing unit, and with a routing connection processing unit 216 that provides routing between the local processing units 202.

Deep learning architectures may perform a pattern recognition task by learning to represent inputs at successively higher levels of abstraction in each layer, thereby building up a useful feature representation of the input data. In this way, deep learning may address a major bottleneck of traditional machine learning. Prior to the advent of deep learning, a machine learning approach to a pattern recognition problem may have relied heavily on human engineered features in combination with a shallow classifier. A shallow classifier may be a two-class linear classifier, for example, in which a weighted sum of the feature vector components may be compared with a threshold to predict a classification for the input. Human engineered features may be templates or kernels tailored to a specific problem domain by engineers with domain expertise. Deep learning architectures, in contrast, may learn to represent patterns through training. Furthermore, a deep learning network may learn to represent and recognize new types of patterns that a human may not have considered.

A convolutional neural network (CNN) may be trained with supervised learning. During training, a CNN may be presented with various viewpoints of various object categories. The network designer may want the CNN to output an estimate of an unknown object and corresponding pose with a high degree of confidence. Before training, the output produced by the CNN is likely to be incorrect, and so an error may be calculated between the actual output and the target output. The weights of the CNN may then be adjusted so that the output scores of the CNN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the CNN may estimate a noise model associated with ground truth 3D sensory image data. A forward pass through the network may yield an output that may be considered an inference or a prediction of the CNN for estimating the noise model associated with ground truth 3D sensory image data. The system simulated sensor information data is used by a trained neural network to simulate sensor information data. Full-stack verification of an autonomous agent system is performed using simulated sensor information data rather than using system simulated photo-realistic sensor image data generated by the noted photo-realistic rendering frameworks. That is, full-stack verification is performed without processing a sensor signal from one or more sensors (e.g., light detection and ranging (LIDAR) sensors, sonar sensors, red-green-blue (RGB) cameras, RGB-depth (RGB-D) cameras, and the like) of the autonomous agent.

Figure 3:
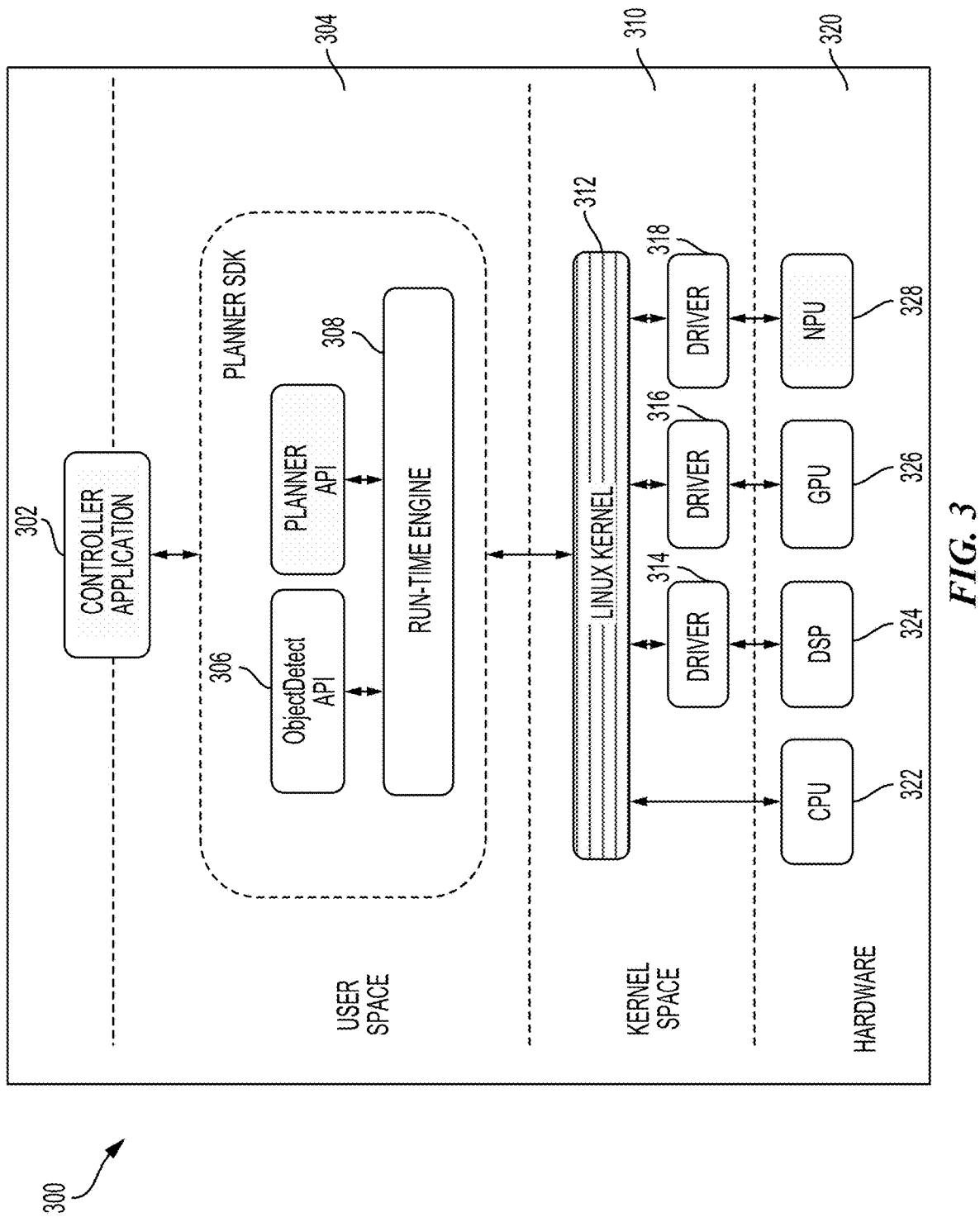
FIG. 3 is a block diagram illustrating an exemplary software architecture that may modularize artificial intelligence (AI) functions for full-stack verification of an autonomous agent vision system, according to aspects of the present disclosure.

FIG. 3 is a block diagram illustrating an exemplary software architecture 300 that may modularize artificial intelligence (AI) functions for planning and control of an autonomous agent in response to detected objects in a surrounding region of the agent, according to aspects of the present disclosure. Using the architecture, a controller application 302 may be designed such that it may cause various processing blocks of an SOC 320 (for example a CPU 322, a DSP 324, a GPU 326 and/or an NPU 328) to perform supporting computations during run-time operation of the controller application 302.

The controller application 302 may be configured to call functions defined in a user space 304 that may, for example, provide for detecting objects in the surrounding region of the autonomous agent. The controller application 302 may make a request to compiled program code associated with a library defined in an ObjectDetect application programming interface (API) 306 to provide an estimate of an object category and corresponding pose of a previously known object. This request may ultimately rely on the output of a convolutional neural network configured to identify objects in a surrounding region of the autonomous agent.

A run-time engine 308, which may be compiled code of a runtime framework, may be further accessible to the controller application 302. The controller application 302 may cause the run-time engine 308, for example, to take actions for controlling the autonomous agent. When a detected object is within a predetermined distance of the autonomous agent, the run-time engine 308 may in turn send a signal to an operating system 310, such as a Linux Kernel 312, running on the SOC 320. The operating system 310, in turn, may cause a computation to be performed on the CPU 322, the DSP 324, the GPU 326, the NPU 328, or some combination thereof. The CPU 322 may be accessed directly by the operating system 310, and other processing blocks may be accessed through a driver, such as drivers 314-318 for the DSP 324, for the GPU 326, or for the NPU 328. In the illustrated example, the deep neural network may be configured to run on a combination of processing blocks, such as the CPU 322 and the GPU 326, or may be run on the NPU 328, if present.

Aspects of the present disclosure are directed to a system and method for fast full-stack verification (e.g., full system verification) of autonomous agents. Verification of autonomous agents is an important task for creating and certifying new autonomous systems, such as driverless cars and robots.

Conventional systems for verifying autonomous systems and/or agents rely on logging the behavior of the system and/or agents under study while the system/agent interacts with its surrounding environment. This verification process may involve creating stress situations to test the behavior of agents in corner cases or atypical situations. Given the risk of these tests for human lives, such tests are usually performed in simulation environments. That is, simulation enables testing of autonomous agent systems for corner cases and extreme situations in a safe way, without putting human lives in danger, for example, as shown in FIGS. 4A and 4B.

Figure 4A:
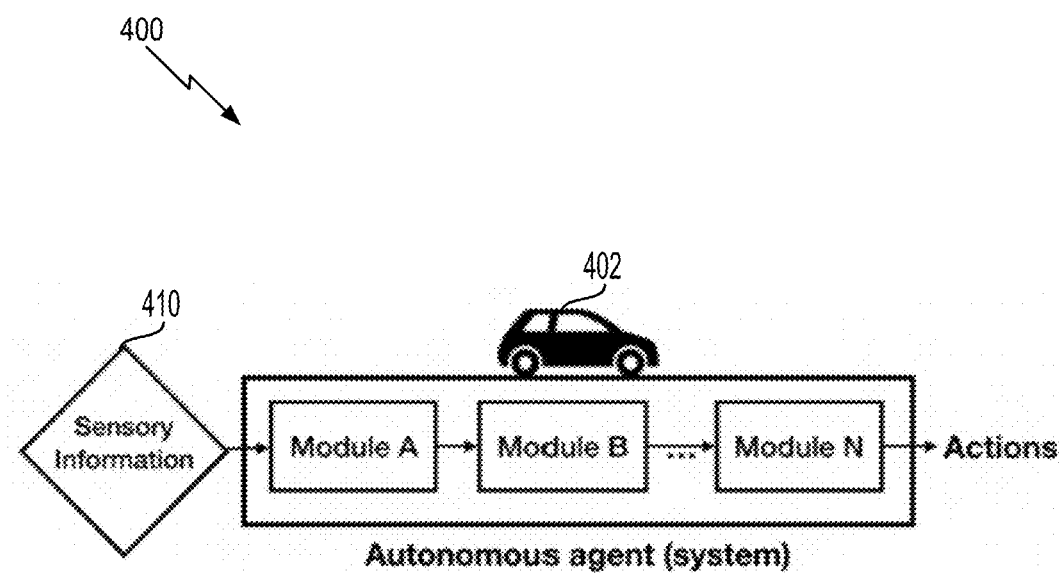
FIGS. 4A and 4B are block diagrams of autonomous agent systems, according to aspects of the present disclosure.
Figure 4B:
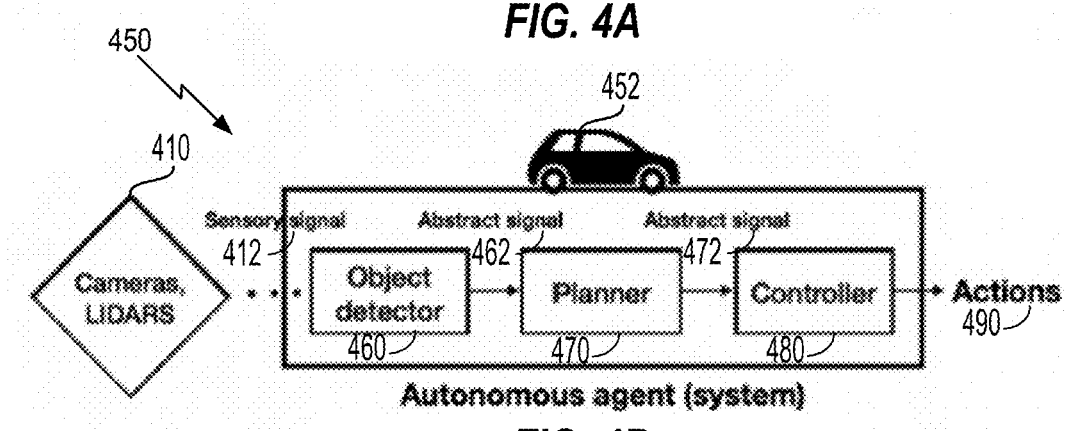

FIGS. 4A and 4B are block diagrams of autonomous agent systems, according to aspects of the present disclosure. FIG. 4A illustrates an autonomous agent system 400 for an autonomous vehicle 402. In this example, the autonomous agent system 400 is formed by multiple modules (e.g., Module A, Module B, Module N) responsible for performing different tasks for controlling the autonomous vehicle in response to sensory information 410.

FIG. 4B illustrates an autonomous agent system 450 for an autonomous vehicle 452. In this configuration, the autonomous agent system 450 also includes various modules for performing tasks in response to sensory information 410. The sensory information 410 may include, but is not limited to, information captured by one or more sensors, such as light detection and ranging (LIDAR) sensors, sonar sensors, red-green-blue (RGB) cameras, RGB-depth (RGB-D) cameras, and the like. A sensory signal 412 may provide this information to the autonomous agent system 450.

In this example, the autonomous agent system 450 is configured to perform tasks, such as perception, localization, planning, and control in response to the sensory signal 412. In this configuration, the autonomous agent system 450 includes an object detector module 460 configured to receive the sensory signal 412 and outputs a first abstract signal 462 representation of one or more detected objects. In response, a planner module 470 may determine a route of the autonomous vehicle 452 in response to the one or more detected objects and output a second abstract signal 472 to a controller module 480. The controller module 480 may be configured to control operation of the autonomous vehicle 452 in response to the second abstract signal 472 to perform various actions 490.

Figure 5:
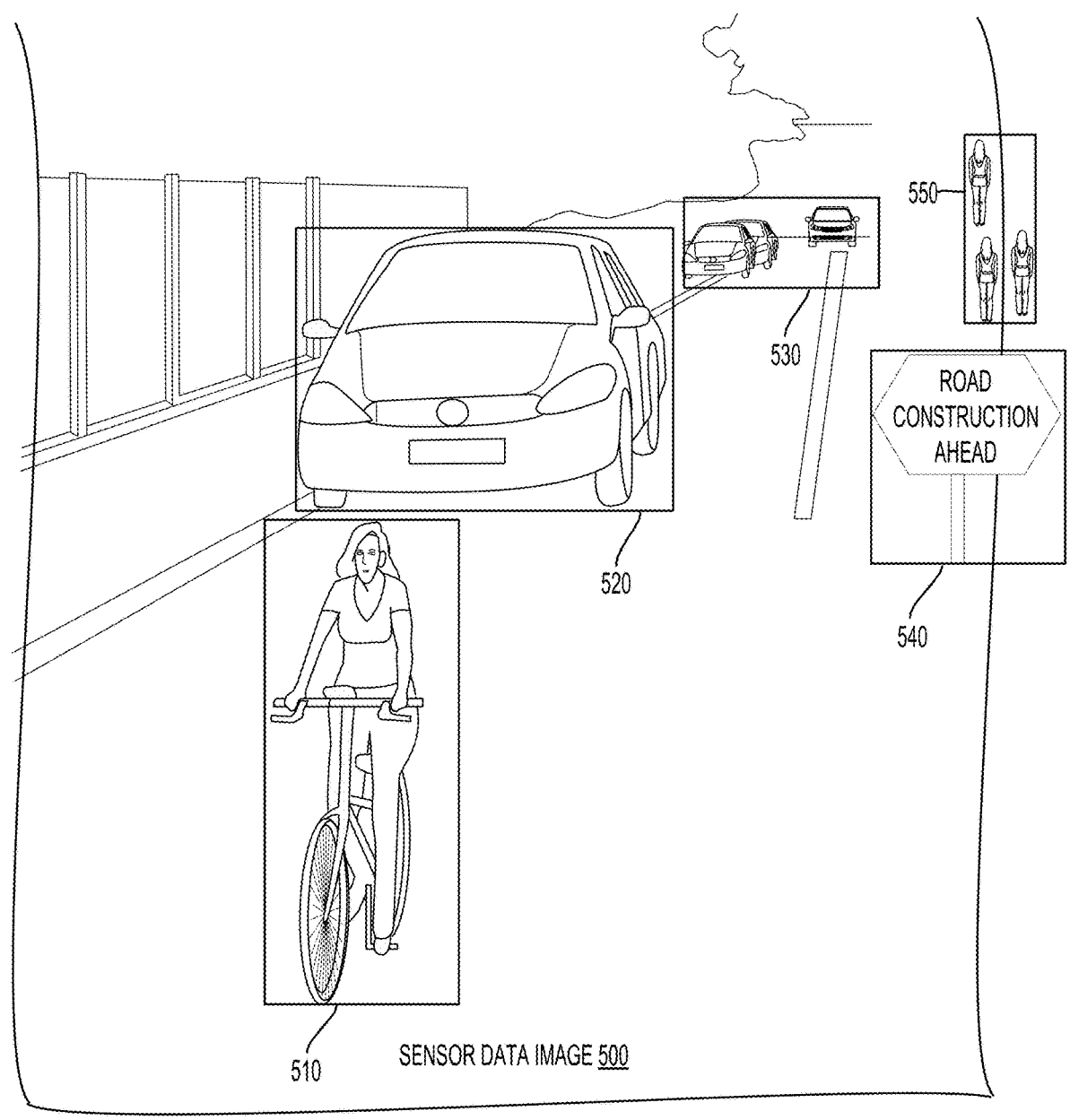
FIG. 5 illustrates a sensor data image captured by a vehicle, according to aspects of the present disclosure.

A detection framework of the autonomous agent system 450 may include multiple sensors for analyzing a 3D area surrounding the autonomous vehicle 452 as a sensor data image, for example, as shown in FIG. 5. Images captured by the sensor may be provided as red-green-blue (RGB) data (or RGB and depth (RGB-D) data). In this configuration, the object detector module 460 is configured to identify a region of interest in an image of the 3D area surrounding the autonomous vehicle 452. The object detector module 460 is configured to detect objects within the region of interest. This detected region of interest and corresponding detected objects are provided to the planner module 470 through the first abstract signal 462.

FIG. 5 illustrates a sensor data image captured by an autonomous vehicle, according to aspects of the present disclosure. In this example, a sensor data image 500 includes various regions of interest within a scene illustrating, for example, an environment including on-coming traffic sensed by a vehicle. Representatively, a first region of interest 510 may include a bicycle rider. A second region of interest 520 includes a vehicle following the bicycle rider in the first region of interest 510. A third region of interest 530 includes further on-coming vehicles. The sensor data image 500 further includes a fourth region of interest 540 including a road construction sign and a fifth region of interest 550 including road workers.

Unfortunately, testing an autonomous agent in real-world situations shown in the sensor data image 500, FIG. 5, may be problematic. In particular, if the autonomous agents possibly interact with the bicycle rider in the first region of interest or the road workers in the fifth region of interest 550, concerns may arise. One specific concern is safety. An objective of the present disclosure is to ensure that an autonomous agent or system is safe without subjecting human beings to danger. To this end, outstanding verification procedures are desired. Currently, state-of-the-art algorithms and systems to verify autonomous systems rely on logging the behavior of the system under study while it interacts with its surrounding environment. This may involve creating stress situations to test the behavior of the agent in corner cases or atypical situations, for example, as shown in FIG. 5. Given the risk of these tests for human lives, such tests may be performed in simulation environments.

In autonomous agent systems, the modules of the system fall into one of the following categories: (i) sensory-information consumer; or (ii) abstract-signal consumer. In other words, there are modules that consume raw sensory information while others just consume abstract signals, such as tracks or parametric representations that can be considered independent from sensor data. In the autonomous agent system 450 of FIG. 4B, the object detector module 460 consumes sensor data (e.g., sensory signal 412), while the planner module 470 and the controller module 480 generally work with abstractions or refinements (e.g., the first abstract signal 462 and the second abstract signal 472) produced as the output of a previous stage.

The planner module 470 and the controller module 480 consume abstract signals, such as object tracks, or parametric representations. As a result, the planner module 470 and the controller module 480 can be tested very efficiently in a simulator because recreating these noted abstract signals is computationally efficient in simulation. Unfortunately, the object detector module 460, which consumes sensory information, is very expensive and slow to test because generating high-fidelity sensor data is involved in simulation testing of the object detector module 460. Therefore, the object detector module 460 is a critical bottleneck during full-stack verification of the autonomous agent system 450. To solve this problem, aspects of the present disclosure include a divide-and-reunite approach as explained below.

Figure 6:
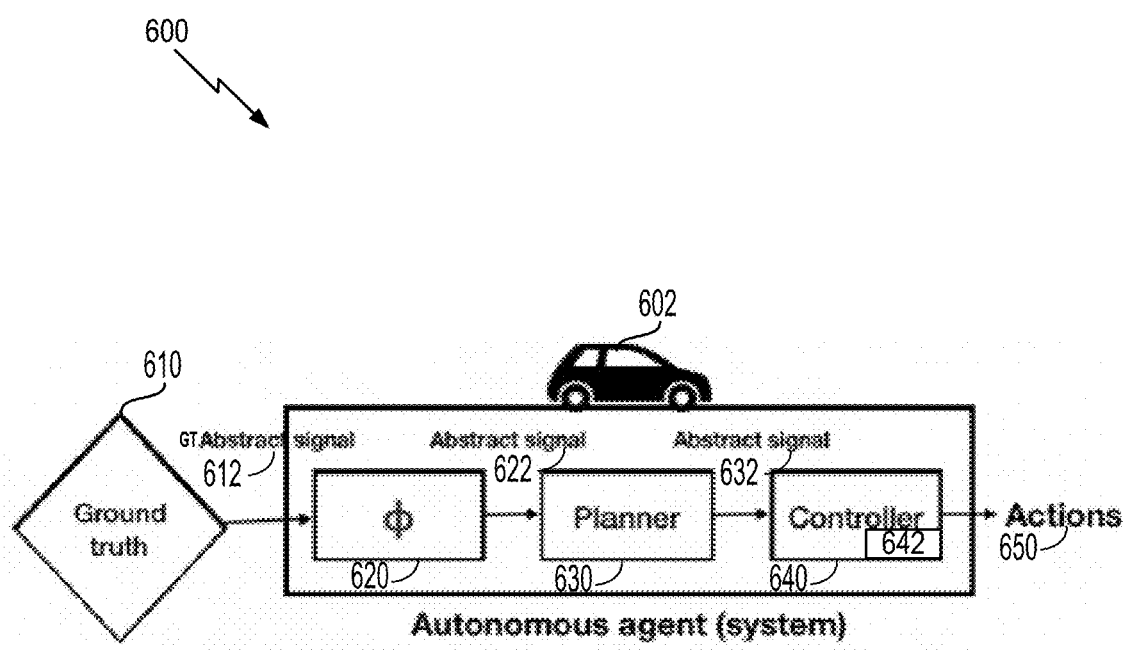
FIG. 6 is a block diagram of an autonomous agent system configured for full-stack verification using system simulated sensor information, according to aspects of the present disclosure.

FIG. 6 is a block diagram of an autonomous agent system configured for full-stack verification using system simulated sensor information, according to aspects of the present disclosure. In this configuration, an autonomous agent system 600 (or alternatively an autonomous vehicle system) is configured to replace an object detector module (e.g., 460) with a neural network 620 (e.g., a surrogate function 1) trained to generate simulated sensor information data in response to ground truth information 610. Using the neural network 620 in place of an object detector module (e.g., 460) enables replacing of a sensory signal input (e.g., 412). Instead, the ground truth information 610 is provided to the neural network 620 through a ground truth (GT) abstract signal 612.

The autonomous agent system also includes a planner module 630 to process a first abstract signal 622 and a controller module 640 to process a second abstract signal to operate an autonomous vehicle 602 in a pipeline of the autonomous agent systems for controlling actions 650 of the autonomous vehicle 602. Following improving of the modules within the pipeline of the autonomous agent system 600 to achieve the full-stack verification, the controller may include a collision avoidance module 642. In aspects of the present disclosure, collision avoidance module 642 provides decision making and control over the behavior of autonomous vehicle 602. In aspects of the present disclosure, the decision making and control features provided by the collision avoidance module 642 during operation of the autonomous vehicle 602 in real-world conditions are certified as correct. Certification of the collision avoidance module 642 to safely control the autonomous vehicle 602 in real-world conditions relies on extreme situations presented by the simulated sensor information in the first abstract signal 622.

In this aspect of the present disclosure, the neural network 620 is trained to provide a surrogate function 1 representing a noise model associated with an object detection module (e.g., 460), trained according to an object detection training data set. In operation, ground truth information 610 is fed to the neural network 620. The ground truth information 610 may represent two-dimensional (2D) and/or three-dimensional (3D) bounding boxes of detected objects in an area surrounding the autonomous vehicle 602. In response to the ground truth information 610 provided in the GT abstract signal 612, the neural network 620 generates a first abstract signal 622 according to the surrogate function 1, adding noise to the 2D bounding boxes of the ground truth information 610. The combination of the noise and 2D bounding boxes of the ground truth information 610 provides simulated sensory information for full-stack verification of the autonomous agent system 600.

Training the neural network 620 to generate the first abstract signal 622 by applying the surrogate function 1 to the GT abstract signal 612 enables replacing of sensory information (e.g., 410) as well as a sensory signal (e.g., 412). System simulated sensory information data avoids a bottleneck during full-stack verification of the autonomous agent system 600. This bottleneck is generally caused by using system simulated photo-realistic sensor image data generated by photo-realistic rendering frameworks. This improved full-stack verification is achieved by supplying a ground truth information 610 to the neural network 620 through the GT abstract signal 612. A process of training the neural network 620 to generate the first abstract signal 622 according to the surrogate function Φ is shown in FIG. 7.

Figure 7:
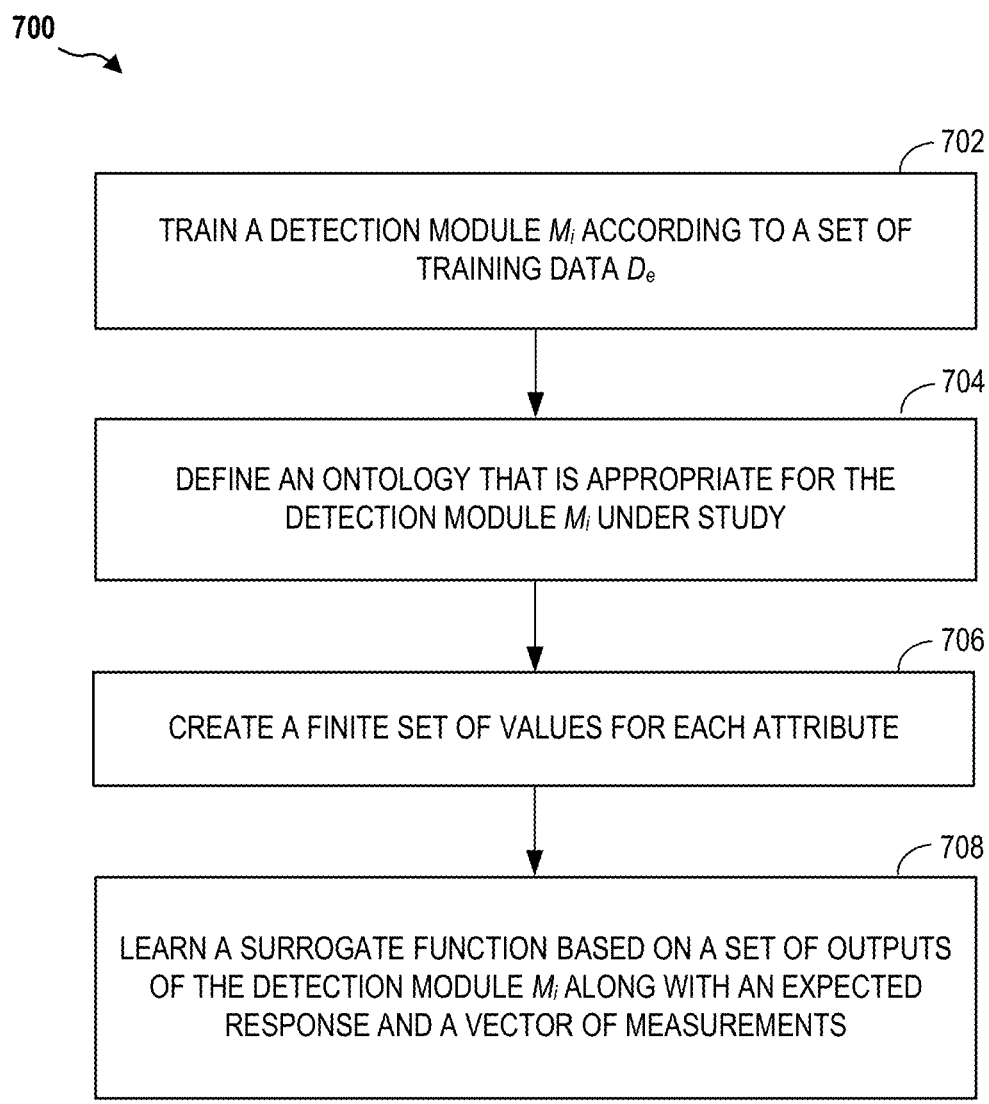
FIG. 7 is a flowchart illustrating a process of training a neural network to generate sensory information for full-stack verification of an autonomous agent system, according to aspects of the present disclosure.
Figure 8:
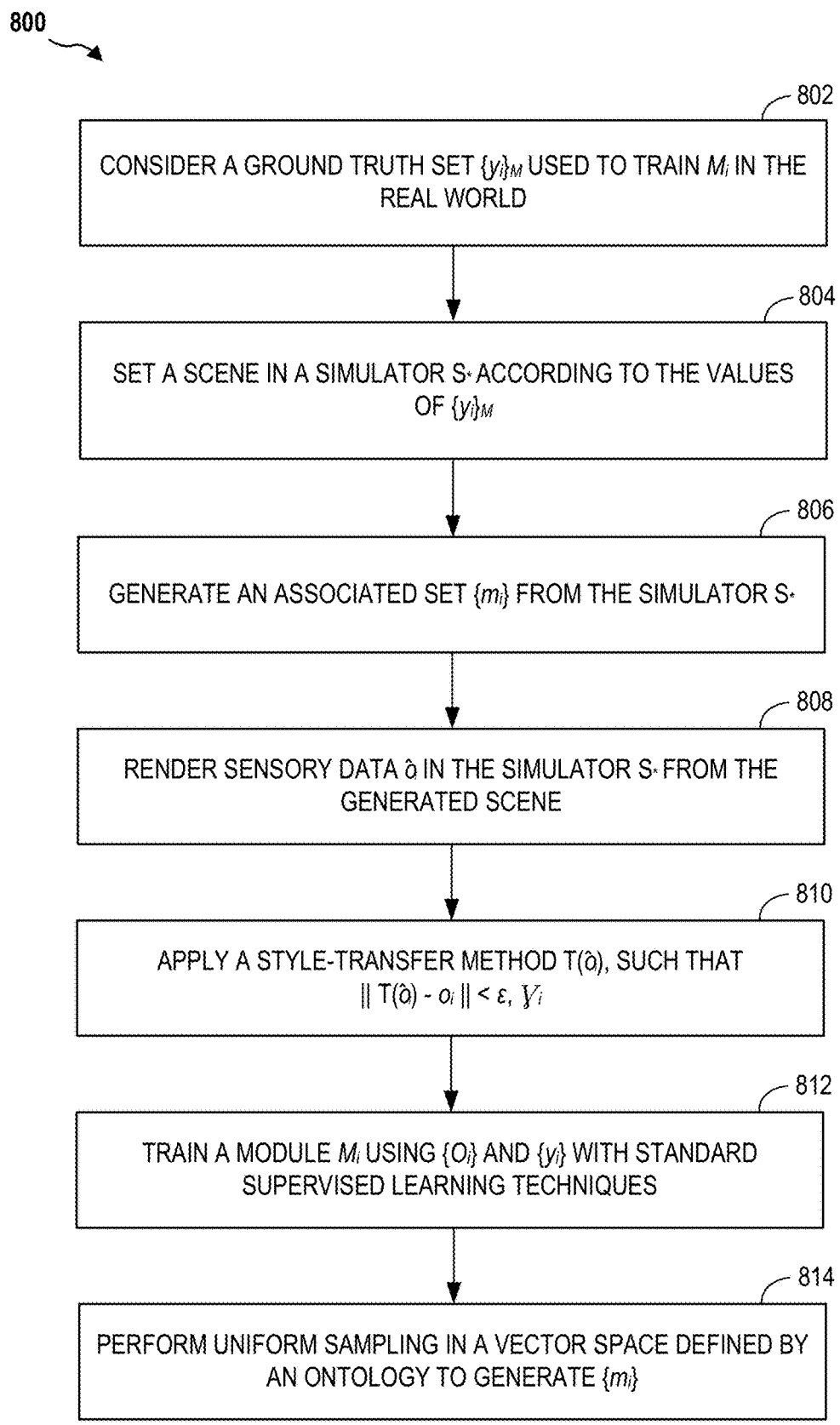
FIG. 8 is a flowchart illustrating a method for training modules in simulation for full-stack verification of an autonomous agent system, according to aspects of the present disclosure.

FIG. 7 is a flowchart illustrating a process of training a neural network to generate simulated sensory information data for full-stack verification of an autonomous agent system, according to aspects of the present disclosure. A process of full-stack verification of an autonomous agent system begins by dividing the modules of the system into two categories Csensor and Cabstract. The Csensor category includes each module (e.g., an object detector module) of the autonomous agent system 600 that consumes sensory information (e.g., sensory signal 412). The Cabstract category includes each module (e.g., the planner module 630 and the controller module 640) of the autonomous agent system 600 that consumes abstract information (e.g., the first abstract signal 622 or the second abstract signal 632). This process may assume that each of the modules present in Csensor have already been deployed for a given environment S, that could be real or simulated. Otherwise, a process for deploying and/or training these modules as shown in FIG. 8.

A method 700 of FIG. 7 begins at block 702, in which a detection module $M_i$ is trained according to a set of training data $D_e$. For example, for a given module $M_i$ from the set of modules Csensor the process starts by running the module $M_i$ for a given set of training data $D_e$. The output of the module $M_i$ is stored for each instance $x_i$ of the training data $D_e$. It is assumed that each instance $x_i=(o_i, y_i, m_i)$ consists of raw sensory data $o_i$, ground truth annotations for the task under consideration $y_i$, and a vector of measurements $m_i$. In this example, the vector of measurements is a set of K categorical and real values that identify certain properties of an i-th observation. For example, the K categorical and real values may include the weather conditions {sunny, cloudy, rainy}, distance of the objects [0,100] meters, etc.

At block 704, an ontology is defined that is appropriate for the detection module $M_i$ under study. For example, to generate measurement vectors $m_i$, the appropriate ontology defined for the module under study may contain priors imposed by human experts that are important conditions for which information is desired. For instance, in the example of object detection, a human expert may identify an ontology with the following elements: weather condition, illumination, distance to objects, and level of occlusions. Once the ontology is defined, at block 706, a finite set of values is created for each attribute (e.g., element) of the vector of measurements $m_i$. Then each case is annotated with the right values for each attribute of the ontology. This process can be performed by humans or automatically within a simulator.

At block 708, a surrogate function Φ is learned based on a set of outputs of the detection module $M_i$ along with an expected response and a vector of measurements. For example, the set of outputs of the detection module is: $M(o_i)=\hat{y}_i$, (e.g., a noisy output $\hat{y}_i$) along with the expected response $y_i$ (e.g., ground truth), and the vector of measurements $m_i$ are used to learn a surrogate function $\varphi_\theta (y_i,m_i)$, where θ represents a set of learned parameters that define the behavior of φ. This process may be carried out using minimization by standard optimization techniques based on gradient decent and risk minimization methods. Here, £ is an appropriate loss function, such as cross-entropy or lp-norm (see Equation (1)). In this aspect of the present disclosure, the purpose of φ is to learn the noise model associated with the output of $M_i$ starting at an ideal prediction (ground truth).

$$\theta^* = \underset{\theta}{\operatorname{argmin}} \sum_{i=1}^{N} \mathcal{L}(\phi_\theta(y_i, m_i), \hat{y}_i). \quad (1)$$

In this example, a given module $M_i$ (e.g., a sensor module $M_i$) is used to learn a surrogate function $\varphi_\theta$ that does not depend on the sensory raw data $o_i$. That is, the function φ is trained to mimic the signature (behavior) of M starting from an ideal estimation (ground truth). In other words, the function φ learns the noise model associated to $M_i$. This is of special interest because such a function mimics the behavior of $M_i$ without generating sensory data.

In aspects of the present disclosure, method 700 is repeated for each of the set of the other sensor modules of Csensor to generate a new set $\Phi=\{\varphi_1, \ldots, \varphi_M\}$. Then the modules M are substituted by their surrogate $\varphi_i$ to form the autonomous agent system 600 of FIG. 6. In this example, the object detector module of the autonomous agent system 600 is replaced with the surrogate function Φ. The autonomous agent system 600 can now be evaluated holistically in the simulator environment $S_A$ without the generation of sensory data. Instead, the raw sensory data o is replaced by the fast-to-compute ground truth signal y, which serves as input to the surrogate function Φ.

A full-stack verification method, according to aspects of the present disclosure, is built upon the following observation: an estimator $F(o_i) = \hat{y}_i$, can also be expressed relative to the ground truth $y_i$, and a noise model $e_i$ for the i-th observation according to Equation (2)

$$\hat{y}_i = F(o_i) = \varphi(y_i, e_i) = y_i + e_i \qquad (2)$$

According to Equation (2), the estimator F can be completely determined from the ground truth $y_i$ and the noise model $e_i$ of the estimator F for the i-th observation. Both the ground truth)), and the noise model $e_i$ of the estimator F can be generated efficiently. In this example, it is assumed that the noise model $e_i$ of the estimator F is a random variable that is not directly observable. Rather, the noise model $e_i$ of the estimator F is a latent variable that can be determined through the measurement vector $m_i$. That is, a full-stack verification method, according to aspects of the present disclosure, assumes that the conditions of a given frame encoded in the vector $m_i$ and the ground truth $y_i$ observations are sufficient for determining $y_i$. Based on these assumptions, the full-stack verification method learns the following function (z) according to Equation (3)

$$z \sim \varphi_\theta(y_i, e_i) y_i + e_i = \hat{y}_i = F(o_i) \qquad (3)$$

According to Equation (3), both $m_i$ and $y_i$ are trivial to generate in simulation. Therefore, a full-stack verification method according to Equation (3) unblocks a bottleneck in conventional full-stack verification methods by replacing sensory data with system simulated sensory information data.

FIG. 8 is a flowchart illustrating a method for training modules in simulation for full-stack verification of an autonomous agent system, according to aspects of the present disclosure. In order to produce a coo estimator with enough fidelity for verification of $M_i$, it is important to have a well-sampled set of measurements $\{m_i\}$ that maximizes the coverage of an ontology associated to the module $M_i$. For these cases, the following procedure is illustrative. A method 800 begins at block 802, in which a ground truth set $\{y_i\}_M$ used to train $M_i$ (in the real world) is considered. At block 804, a scene is set in a simulator $S_*$ according to the values of $\{y_i\}_M$. At block 806, an associated set $\{m_i\}$ is generated from the simulator $S_*$. At block 808, sensory data $\hat{o}_i$ is rendered in the simulator $S_*$ from the generated scene. At block 810, a style-transfer method $T(o)$, such that $\|T(\hat{o}_i) - o_i\| < \varepsilon, \gamma_i$ is applied. In this example, the style transfer method processes the sensory data $\hat{o}_i$ to provide an approximation of the raw sensory data $\hat{o}_i$. At block 812, a module $M_i$ is trained using $\{\hat{o}_i\}$ and $\{y_i\}$ with standard supervised learning techniques. At block 814, uniform sampling is performed in a vector space defined by an ontology to generate $\{m_i\}$.

Figure 9:
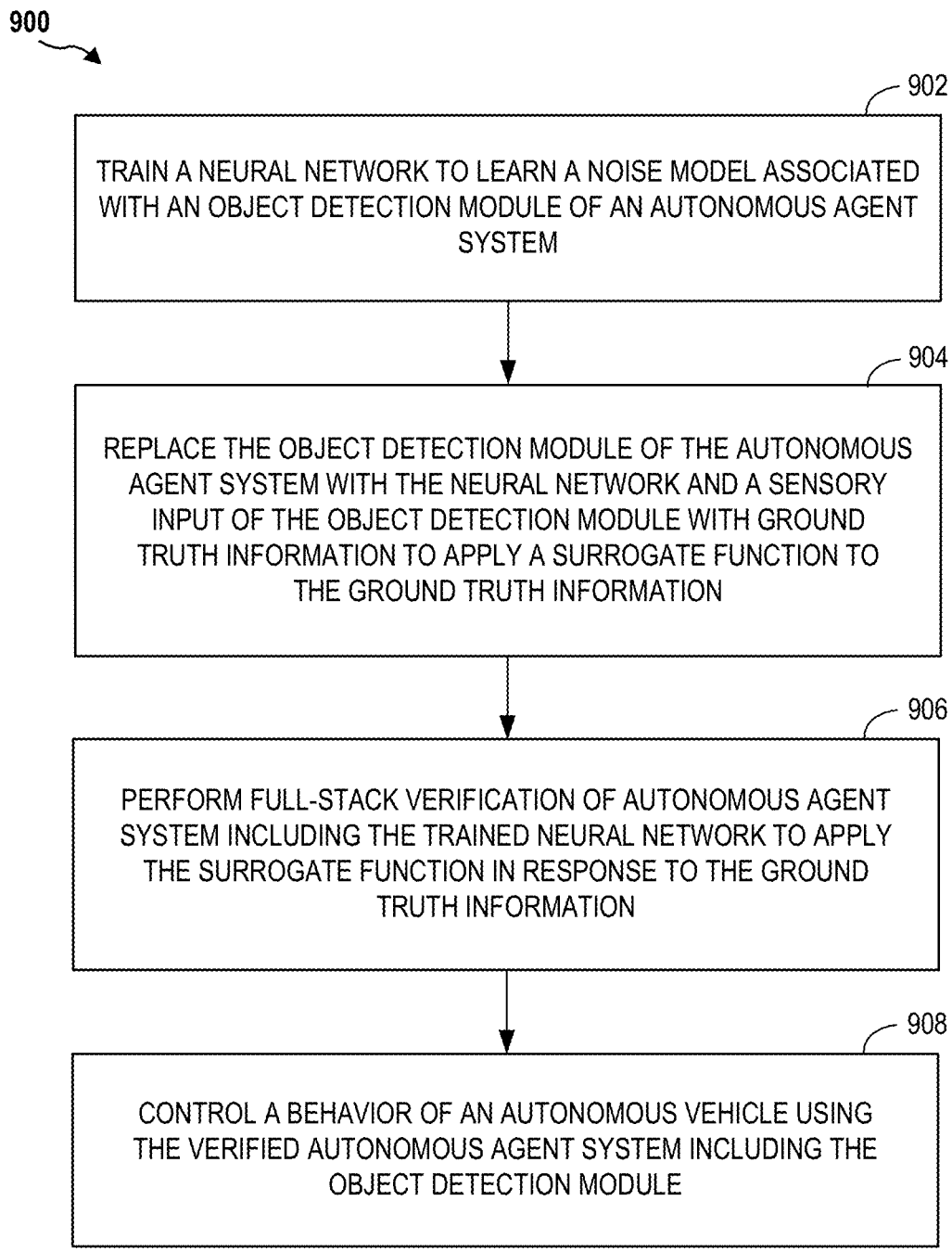
FIG. 9 illustrates a method for full-stack verification of an autonomous agent system using system simulated sensor information, in accordance with aspects of the present disclosure.

FIG. 9 illustrates a method for full-stack verification of an autonomous agent system using system simulated sensor information data, in accordance with aspects of the present disclosure. A method 900 begins in block 902, in which a neural network is trained to learn a noise model associated with an object detection module of an autonomous agent system. For example, as shown in Equation (1), a surrogate function coo is learned through a supervised learning process to estimate a noise model associated with a sensory information consumer module (e.g., an object detection module) of the autonomous agent system.

In block 904, the object detection module of the autonomous agent system is replaced with a neural network and a sensory input of the object detection module is replaced with ground truth information to apply a surrogate function to the ground truth information. For example, as shown in FIGS. 4B and 6, the object detector module 460 is replaced with a neural network 620 (e.g., a trained neural network) to apply the surrogate function Φ. In addition, the sensory information 410 is replaced with ground truth information 610.

Referring again to FIG. 9, in block 906, full-stack verification of the autonomous agent system including the trained neural network to apply the surrogate function in response to the ground truth information is performed. At block 908, a behavior of an autonomous vehicle is controlled using the verified autonomous agent system including the object detection module. For example, as shown in FIG. 6, once the autonomous agent system 600 is verified, the neural network 620 may be replaced by an original object detection module, such as the object detector module 460 of FIG. 4B. The method 900 may further include certifying collision avoidance of the autonomous vehicle using extreme situations presented by the simulated sensor information. For example, as shown in FIG. 6, certifying the collision avoidance module 642 to safely control the autonomous vehicle 602 in real-world conditions relies on extreme situations presented by the simulated sensor information in the first abstract signal 622.

The method 900 may further include optimizing the planner module of the autonomous vehicle prior to controlling the behavior of the autonomous vehicle. For example, the planner module 630 may be reconfigured to improve, for example, simulated operation of the autonomous vehicle during corner cases or atypical situations presented by the simulated sensor information data. The method 900 may also include optimizing the controller module of the autonomous vehicle prior to controlling the behavior of the autonomous vehicle. For example, the controller module 640 may be reconfigured to improve, for example, operation of the autonomous vehicle during real-world corner cases or atypical situations similar to those presented by the simulated sensor information data.

Aspects of the present disclosure are related to a machine learning system and method for performing full-stack verification of autonomous agents in cases where the autonomous agent consumes sensory data. One configuration of the full-stack verification system is designed to avoid the computational overhead associated with rendering photo-realistic sensory data in simulation through a novel system re-parametrization. This aspect of the present disclosure can reduce costs and a time of system verification, enabling large-scale full-stack verification procedures.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for full-stack verification of autonomous agents, comprising:
training a neural network to learn a noise model associated with an object detection module of an autonomous agent system of an autonomous vehicle by:
training the neural network to learn a surrogate function to mimic the behavior of a sensor module $M_i$ by learning the noise model associated with the sensor module $M_i$, and
repeating the training for other sensor modules of the autonomous agent system to generate a set of the surrogate function for full-stack verification of the autonomous agent system;
replacing the object detection module of the autonomous agent system with the neural network and a sensory input of the object detection module with ground truth information to apply a surrogate function to the ground truth information;
verifying the autonomous agent system including the trained neural network to apply the surrogate function in response to the ground truth information to simulate sensor information data to at least a planner module of the autonomous agent system; and
controlling a behavior of the autonomous vehicle using the verified autonomous agent system including the object detection module.

2. The method of claim 1, further comprising:
improving the planner module of the autonomous vehicle prior to controlling the behavior of the autonomous vehicle according to simulated operation of the autonomous vehicle during corner cases or atypical situations presented by a simulated sensor information data.

3. The method of claim 1, further comprising:
improving a controller module of the autonomous vehicle prior to controlling the behavior of the autonomous vehicle according to simulated operation of the autonomous vehicle during corner cases or atypical situations presented by a simulated sensor information data.

4. The method of claim 3, in which verifying comprises:
certifying collision avoidance of the autonomous vehicle during extreme situations presented by the simulated sensor information data.

5. The method of claim 4, further comprising:
operating the autonomous vehicle using a certified collision avoidance module in a pipeline of the autonomous agent system to improve the operation of the autonomous vehicle during the real-world extreme situations and/or atypical real-world situations.

6. A method for full-stack verification of autonomous agents, comprising:
training a neural network to learn a noise model associated with an object detection module of an autonomous agent system of an autonomous vehicle by:
running the object detection module M for a set of training data $D_e$ to determine a noisy output $\hat{y}_i$; and estimating the noise model of the object detection module M based on the noisy output $\hat{y}_i$ and a ground truth $y_i$ of the object detection module M;

replacing the object detection module of the autonomous agent system with the neural network and a sensory input of the object detection module with ground truth information to apply a surrogate function to the ground truth information;

verifying the autonomous agent system including the trained neural network to apply the surrogate function in response to the ground truth information to simulate sensor information data to at least a planner module of the autonomous agent system; and controlling a behavior of the autonomous vehicle using the verified autonomous agent system including the object detection module.

7. The method of claim 6, further comprising:
defining an ontology for the object detection module M; and
creating a finite set of values for each attribute of a vector of measurements.

8. A non-transitory computer-readable medium having program code recorded thereon for full-stack verification of autonomous agents, the program code being executed by a processor to perform steps comprising:

training a neural network to learn a noise model associated with an object detection module of an autonomous agent system by:
training the neural network to learn a surrogate function to mimic a behavior of a sensor module $M_i$ by learning a noise model associated with the sensor module $M_i$, and
repeating the training for other sensor modules of the autonomous agent system to generate a set of the surrogate function for full-stack verification of the autonomous agent system;

replacing the object detection module of the autonomous agent system with the neural network and a sensory input of the object detection module with ground truth information to apply a surrogate function to the ground truth information;

verifying the autonomous agent system including the trained neural network to apply the surrogate function in response to the ground truth information to simulate sensor information data to at least a planner module of the autonomous agent system; and controlling a behavior of an autonomous vehicle using the verified autonomous agent system including the object detection module.

9. The non-transitory computer-readable medium of claim 8, in which steps comprise:
training the neural network to learn the surrogate function to mimic the behavior of a sensor module M by learning the noise model associated with the sensor module M; and
repeating the program code to training the neural network for other sensor modules of the autonomous agent system to generate a set of the surrogate function for the full-stack verification of the autonomous agent system.

10. The non-transitory computer-readable medium of claim 8, in which steps further comprise:
running the object detection module M for a set of training data $D_e$ to determine a noisy output $\hat{y}_i$; and
estimating the noise model of the object detection module M based on the noisy output $\hat{y}_i$ and a ground truth $y_i$ of the object detection module M.

11. The non-transitory computer-readable medium of claim 10, further comprising:
defining an ontology for the object detection module M; and
creating a finite set of values for each attribute of a vector of measurements.

12. The non-transitory computer-readable medium of claim 8, further comprising:
optimizing the planner module of the autonomous vehicle according to simulated operation of the autonomous vehicle during corner cases or atypical situations presented by a simulated sensor information data.

13. The non-transitory computer-readable medium of claim 8, further comprising:
optimizing a controller module of the autonomous vehicle according to simulated operation of the autonomous vehicle during corner cases or atypical situations presented by a simulated sensor information data.

14. The non-transitory computer-readable medium of claim 8, further comprising:
certifying collision avoidance of the autonomous vehicle during extreme situations presented by a simulated sensor information data.

15. A system for full-stack verification of an autonomous vehicle system, comprising:
a neural network configured to learn a noise model associated with an object detection module of the autonomous vehicle system, in which the object detection module of the autonomous vehicle system is replaced with the neural network and a sensory input of the autonomous vehicle system is replaced with ground truth information during the full-stack verification, the neural network further configured to apply a surrogate function to the ground truth information to simulate sensor information data to at least a planner module of the autonomous vehicle system, in which the neural network is trained to learn a surrogate function to mimic the behavior of a sensor module $M_i$ by learning a noise model associated with the sensor module $M_i$, and to repeat the training for other sensor modules of the autonomous agent system to generate a set of the surrogate function for the full-stack verification during corner cases and/or atypical situations presented by a simulated sensor information data; and
a controller configured to improve behavior of an autonomous vehicle during real-world extreme situations.

16. The system for the full-stack verification of the autonomous vehicle system of claim 15, in which the planner module is further configured to improve route planning for the autonomous vehicle based on predicted actions of surrounding agents during the real-world extreme situations.

17. The system for the full-stack verification of the autonomous vehicle system of claim 15, in which the controller is further configured to improve operation of the autonomous vehicle during the real-world extreme situations.

18. The system for the full-stack verification of the autonomous vehicle system of claim 15, in which the controller further comprises a collision avoidance module, in which operation of the collision avoidance module is certified as correct and safe using the extreme situations presented by the simulated sensor information data.

19. The system for the full-stack verification of the autonomous vehicle system of claim 15, in which the ground truth information comprises two-dimensional (2D) and/or three-dimensional (3D) bounding boxes of detected objects in an area surrounding the autonomous vehicle.

\* \* \* \* \*